Feb. 5, 1963

M. TANENBAUM 3,076,732

UNIFORM N-TYPE SILICON

Filed Dec. 15, 1959

INVENTOR
M. TANENBAUM
BY George S. Indig
ATTORNEY 3,076,732
Patented Feb. 5, 1963

3,076,732

UNIFORM n-TYPE SILICON

Morris Tanenbaum, Madison, N.J., assignor to Bell Telephone Laboratories, Incorporated, New York, N.Y., a corporation of New York Filed Dec. 15, 1959, Ser. No. 859,810
5 Claims. (Cl. 148—1.5)

Figure 1:
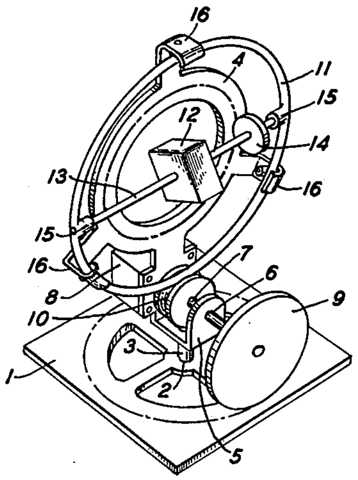

This invention relates to the preparation of uniform resistivity n-type silicon, to the manufacture of semiconductor devices utilizing such material and to the material and devices so produced. The n-type silicon of this invention is produced by nuclear transmutation.

Most commercial uses of semiconductor materials require single crystals of very accurately controlled resistivity. In certain instances, this requirement arises from the nature of the semiconductor device itself, i.e., the avoidance of marked resistivity gradients affecting electrical characteristics. In others, where the device does not give rise to this requirement, the characteristics of the starting material may determine the position and nature of junctions and gradients produced during manufacture, so that initially uniform properties in the starting material are necessary.

In the processing of certain semiconductor materials, uniform resistivity levels, in either conductivity type, are obtained with ease. For example, in germanium, the generally favorable distribution coefficients of many significant impurities across liquid-solid interfaces permit uniform distribution by use of zone-leveling techniques. Such semiconductor materials are readily obtainable at a variety of doping levels for either conductivity type, with a resistivity uniformity of well within five percent over the major portion of the crystal.

In other semiconductor materials, constant resistivity is not so easily obtained. The distribution coefficients for most significant impurities in silicon and the increased activity of this material at its higher melting point complicate the problem in this material. Uniform p-type silicon has been produced by either of two methods. Using boron with a distribution coefficient of approximately 0.9, uniform crystals have been produced by crystal pulling. Using the floating zone technique with aluminum, having a distribution coefficient of 0.004, p-type silicon of a high degree of uniformity has been produced by zone-leveling.

The preparation of uniform resistivity n-type silicon has been a more difficult problem. The usual donor impurities of group V of the periodic table do not lend themselves to use in conventional processing techniques. Certain of these impurities, antimony and bismuth, are sufficiently volatile at the melting point of silicon that it is difficult to control their concentration during the usual crystal growing procedures. The less volatile group V impurities, phosphorus and arsenic, have distribution coefficients which are too small to permit their use in crystal pulling and too large to permit their use in zone-leveling procedures.

The literature describes experimental procedures designed to compensate for the excessive vaporization of the more volatile donors. In accordance with one such method, silicon crystals are pulled from phosphorus-doped melts in vacuum, under conditions such that the depletion of the donor impurity in the melt due to evaporation compensates for enrichment due to crystallization. See Journal of Electronics, volume 2, page 134, 1956. It is apparent that commercial feasibility of this process is dependent upon the delicate balancing of two conditions.

In accordance with this invention, uniform n-type silicon over a broad range of resistivity levels is produced.

The inventive methods are based on a nuclear reaction in which a thermal neutron is captured by the stable isotope, silicon 30, to form the unstable isotope, silicon 31. This unstable isotope decays by the emission of a 1.471 million electron volts $\beta^-$ particle with a half-life of 2.62 hours to the stable isotope, phosphorous 31.

In actual examples described herein, uniform n-type silicon having resistivity levels of the order of 0.3 ohm-centimeter, and also of the order of 2.5 ohm-centimeters, was produced. These crystals evidenced a uniformity within the measurement capability of plus or minus 3 percent over their lengths.

Calculated cross sections for the responsible reaction, based on reported measurements of thermal neutron densities in the reactors used and on the donor concentrations in the treated materials, are in general agreement with published cross sections for the mechanism. Small deviations, probably due to competing reactions, are probably responsible for these deviations, and since they obtain for a given neutron spectrum and density, result only in an adjustment of the effective cross section and permit the attainment of the same resistivity uniformity from crystal to crystal.

It is apparent that uniform material may be obtained over a very broad range of resistivity values. For any given set of spectrum and density conditions, and for a given time of exposure, only two factors need be considered. The first is the density of stable isotope, silicon 30 in a given sample. However, a study of natural silicates from widely scattered sources has shown the occurrence of this isotope to be constant, with an average deviation of silicon 30 to silicon 28 ratio of 0.35 per mil. The results reported herein are in general agreement. The only other factor to be considered is the uniformity of significant impurity atom concentration in the starting material.

Barring the occurrence of undesirable side reactions due to capture of neutrons by impurities present in non-uniform concentrations (discussed herein), non-uniform resistivity characteristics due to the starting material may be avoided simply by utilizing material of so high a resistivity that the expected maximum variation in this starting material is masked by the doping process. Accordingly, use of starting silicon with a resistivity level of 10,000 ohm-centimeters and a carrier variation of plus or minus 100 percent permits preparation of 300 ohm-centimeter material to a uniformity of plus or minus 3 percent and 500 ohm-centimeter material to a uniformity of plus or minus 5 percent. For the purposes of this description it is considered desirable to utilize initial silicon having an excess significant impurity concentration at least an order of magnitude less than the final value, so reducing non-uniformity due to this cause by 90 percent.

10,000 ohm-centimeter silicon is readily available. Higher resistivity material may be prepared by reported methods. See, for example, copending United States application Serial Number 780,828, filed December 16, 1958. Better uniformity is permitted either by higher resistivity starting material or lower resistivity final material. Practical limitations on available resistivity levels are dependent upon the conditions which obtain in available reactors. These considerations are generally economic by nature and are based on bombardment cost.

It will be seen that doping of silicon to n-type by nuclear transmutation, in accordance with this invention, produces two undesirable side results. Initially, the crystal treated by these processes is dangerously radioactive. The source of this radioactivity is postulated, and the empirical half-life is reported. It is shown that the unstable isotope responsible for this radioactivity has a relatively short half-life, and that materials processed in accordance with this invention become safe for handling after a period of several days. It has been found, too, that neutron bombardment results in a certain amount of damage to the crystal. A range of annealing conditions sufficient to remove this radiation damage has been determined and is reported. The conditions are such that they are generally met by subsequent processing steps in the manufacture of a semiconductor device. For example, conventional diffusion procedures used to create one or more junctions invariably raise the material to a temperature for a time sufficient to cure these defects. Resistivity measurements before and after such annealing are reported herein.

As is seen from the examples, the samples used under the described reactor conditions showed no perceptible non-uniformity dependent on the direction from which a particular surface was bombarded. It is believed, in general, that these conditions will obtain in any thermal nuclear pile, and that the neutron density incident on any exposed surface will be uniform. Where, however, it is found that non-uniformities traceable to this cause are present, it may be considered expeditious to mount the sample on a rotating member driven, for example, by a clock-work mechanism, so as to average out the bombardment density for any given position on the crystal. Where a still higher degree of uniformity is required, a more refined mount providing for rotation about two, or even three, axes may be visualized. Ideally, for a specimen so mounted, any non-uniformity in final resistivity is traceable only to the very slight concentration gradient of phosphorus 31, due to the decreasing neutron density with distance of penetration from the surface of the sample. Calculations on the basis of measured absorption lengths indicate the feasibility of irradiating a cube of silicon of the order of a cubic foot in volume while achieving a resistivity uniformity of the order of 5 percent.

Figure 2:
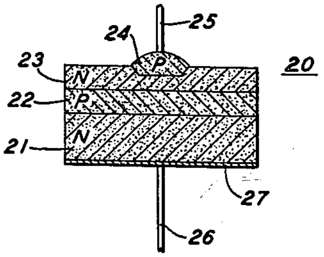

Various aspects of the invention are discussed in conjunction with the drawing, in which:

FIG. 1 is a perspective view of a silicon sample so mounted as to be simultaneously rotated about three axes during neutron bombardment; and FIG. 2 is a front elevational plan view in section of a semiconductor transducing device made of a body of n-type silicon in accordance with this invention.

Referring to FIG. 1, there is shown a circular platform 1, provided with a bearing hole 2, in which there is inserted the pivot portion 3 of frame 4. A U-shaped member 5, rigidly attached to, or a part of, frame 4, is provided with bearing holes 6, through which there is inserted pivot member 7, coupled with clock-work or other driving means 8, which latter is secured to frame 4. The other end of pivot member 7 is attached to rotary driving means 9, which frictionally engages platform 1, and also to rotary driving means 10, which frictionally engages ring 11. Ring 11 is retained in position by loosely fitted guide members 16, which permit rotation of ring 11 on its plane and about its center. Silicon sample 12 is mounted on pivot member 13, which turns about pivot pins 15 in ring 11 and which is fitted with disc 14, frictionally engaging the facing surface of frame 4. The engaging peripheral surface length of disc 14 must be such that the engaging length of frame 4 is not an integral multiple.

In operation, driving means 8 rotates rotary driving means 9, which frictionally engages platform 1, so rotating frame 4 and ring 11, together with sample 12 and other mounting means, about the axis of pivot portion 3. This driving means also produces rotation of bearing means 10 which, in engaging ring 11, produces rotation of this member about an axis normal to that of pivot portion 3. Rotation of ring 11 about this axis through frictional engagement with disc 14 produces rotation of member 13, together with sample 12.

The figure is, of course, merely illustrative of any of several means for bringing about the desired rotation of the sample. In most instances, no rotation at all is indicated. Where rotation is desired, a single axis may suffice. Where three-axis rotation is desired, it is expected that the apparatus utilized will be so designed as to result in a greater space economy. Although for pedantic purposes the frame and rotating structure have been shown as occupying a greater space than the sample, it is expected that more closely spaced, thinner wire structures would be utilized.

FIG. 2 depicts a semiconductor transducing device advantageously utilizing an initial body of n-type silicon in accordance with this invention. The device 20 shown is a p-n-p-n transistor switch made of an n-type parent block of which region 21 remains unconverted, succeeding p- and n-type regions 22 and 23 produced by double diffusion of donors and acceptors and p-type region 24 produced by alloying. The device is completed by electrodes 25 and 26, the first making electrical contact to region 24, the latter contacting n-type region 21 through contact area 27, which may be a gold-antimony alloy. The p-n-p-n switch is described in detail in Proceedings of the Institute of Radio Engineers, volume 44, pages 1174–1182, September 1956. References showing suitable processing techniques are noted in that article.

The p-n-p-n switch is, of course, merely illustrative of a vast group of devices which may advantageously be manufactured in accordance with this invention. Devices of this nature fall into that group discussed in which uniformity in the initial body is of prime importance in determining the nature and position of junctions produced in successive processing steps. It is apparent that each of the junctions intermediate regions 21, 22, 23 and 24 is fixed at that depth at which the opposite type impurity proceeding inwardly by diffusion or alloying is in sufficient concentration to compensate for the predominant significant impurity already present.

The p-n-p-n switch of FIG. 2, chosen as exemplary of a large class of devices, is of particular significance. Although such devices may be constructed starting with a p-type parent body of silicon, as described in the Proceedings of the Institute of Radio Engineers article cited above, this, in turn, necessitates the use of n-conductivity inducing type impurities in region 22. Experience in the manufacture of diffused devices has, however, indicated that diffusion procedures utilizing p-type impurities are more easily controllable in this use. It is indicated, therefore, that the use of an n-type parent body, even of the same uniformity as that of p-type silicon produced by other methods, nevertheless permits the more expeditious manufacture of reproducible switches. In accordance with present processing techniques, the switching device of FIG. 2 makes use of a parent body of a resistivity level of the order of .5 ohm-centimeter.

The following examples relate to irradiations carried out in two different reactors, the first in the light water moderated heterogeneous reactor at Oak Ridge, the other in the graphite moderated heterogeneous reactor at Brookhaven. Certain characteristics of the reactors are noted in the examples. Resistivity measurements, both initial and after bombardment and varying degrees of annealing, are reported in tabular form.

EXAMPLE 1

The initial crystals were in the shape of bars of dimensions 0.2 x 0.2 x 2.0 centimeters, initially of p-type conductivity, the first pair having a resistivity of 1250 ohm-centimeters and the second pair having a resistivity of the order of 650 ohm-centimeters. The first pair of samples were cut from a floating zone-refined crystal designated ZR–3B, the second pair, from a floating zone-refined crystal designated ZRI–61A. The samples are referred to as bars 1, 2, 3 and 4; 1 and 2, from the first crystal, and 3 and 4, from the second. Original floating zone designations are retained. Bars 5 and 6 are control samples, also of dimension 0.2 x 0.2 x 2.0 centimeters, bar 5 cut from crystal ZR–3B and bar 6 from ZRI–61A. Bars 5 and 6 were not irradiated but were, in other manner, treated as were bars 1 through 4. Bars 1 through 4 were irradiated for 282.5 hours in the Brookhaven reactor at a flux of $1.36\times10^{13}$ thermal neutrons per square centimeter per second, so indicating a total thermal neutron flux of $1.38\times10^{19}$ per square centimeter.

Resistivity measurements are indicated on the following table:

Columns 3 and 4 record resistivity measurements made after annealing under the conditions noted, column 3 referring to measurements made on the samples after heating at 200 degrees centigrade for one hour, and column 4, after an additional annealing at 400 degrees centigrade for one hour. Prior to each of the annealing steps reported in these and subsequent columns, the samples were etched as described. Annealing was carried out in air. The control samples were heat treated and etched under the same conditions. From column 4, it is seen that after a first annealing for one hour at 200 degrees centigrade and a second annealing for one hour at 400 degrees centigrade the samples have gone slightly n-type but

*Table I*

RESISTIVITY OF ANNEALED SAMPLES FROM EXPERIMENT 1

| | Initial resis. | After Bombardment | 1 hour 200° C. | 1 hour 400° C. | 1 hour 600° C. | 1 hour 800° C. | 1 hour 1,200° C. |
|---|---|---|---|---|---|---|---|
| | P | P | P | Sl. N | N | N | N |
| Bar 1 (ZR-3B—Bombarded) | 1,230 | 113,000 | 153,000 | 57,500 | 4.02 | 2.43 | 2.63 |
| | 1,231 | 112,000 | 148,000 | 25,600 | 4.12 | 2.49 | 2.63 |
| | 1,232 | 111,700 | 148,200 | 57,700 | 4.15 | 2.49 | 2.67 |
| | 1,253 | 111,500 | 148,800 | >72,000 | 4.15 | 2.50 | 2.67 |
| | P | P | P | Sl. N | N | N | N |
| Bar 2 (ZR-3B—Bombarded) | 1,283 | 114,700 | 152,500 | 41,500 | 3.69 | 2.51 | 2.57 |
| | 1,258 | 116,000 | 151,500 | >107,000 | 3.64 | 2.54 | 2.57 |
| | 1,265 | 114,500 | 150,000 | >107,000 | 3.70 | 2.54 | 2.52 |
| | 1,271 | 111,500 | 152,000 | 51,500 | 3.74 | 2.51 | 2.52 |
| | P | P | P | Sl. N | N | N | N |
| Bar 3 (ZR1-61A—Bombarded) | 771 | 83,100 | 122,800 | 16,000 | 4.00 | 2.54 | 2.62 |
| | 743 | 84,200 | 121,000 | 17,300 | 3.98 | 2.54 | 2.62 |
| | 710 | 84,250 | 121,200 | 92,300 | 3.91 | 2.52 | 2.62 |
| | 683 | 85,000 | 120,500 | >141,500 | 3.84 | 2.50 | 2.59 |
| | 648 | 85,250 | 122,000 | >141,500 | 3.83 | 2.50 | 2.59 |
| | 633 | 86,000 | 122,000 | 88,700 | 3.86 | 2.46 | 2.59 |
| | 611 | 88,500 | 126,500 | >141,500 | 3.91 | 2.46 | 2.59 |
| | P | P | P | Sl. N | N | N | N |
| Bar 4 (ZR1-61A—Bombarded) | 609 | 83,500 | 118,300 | 16,000 | 4.05 | 2.62 | 2.73 |
| | 625 | 83,400 | 115,000 | 49,800 | 4.02 | 2.62 | 2.70 |
| | 643 | 83,100 | 115,500 | 115,700 | 4.05 | 2.62 | 2.67 |
| | 668 | 83,000 | 115,500 | >141,500 | 4.08 | 2.62 | 2.67 |
| | 678 | 82,000 | 115,400 | >141,500 | 4.02 | 2.62 | 2.70 |
| | 710 | 82,900 | 116,500 | 73,700 | 3.96 | 2.62 | 2.70 |
| | P | | P | P | P | Sl. N | N |
| Bar 5 (ZR-3B, control—Not bombarded) | [1] 1,350 | — | 1,241 | 2,310 | 1,400 | 2,250 | 723 |
| | 1,420 | — | 1,282 | 2,280 | 1,430 | >7,100 | 229 |
| | 1,423 | — | 1,268 | 2,400 | 1,460 | 1,610 | 83.5 |
| | 1,432 | — | 1,264 | 2,420 | 1,520 | 3,560 | 80.3 |
| | 1,480 | — | 1,282 | 2,510 | 1,528 | 4,439 | 100 |
| | P | | P | P | P | Sl. P | N |
| Bar 6 (ZR1-61A, control—Not bombarded) | 750 | — | 764 | 962 | 958 | 1,004 | 231 |
| | 737 | — | 733 | 911 | 885 | 892 | 208 |
| | 706 | — | 721 | 872 | 850 | 1,032 | 348 |
| | 694 | — | 792 | 842 | 825 | 1,038 | 493 |
| | 680 | — | 670 | 806 | 800 | 1,055 | 338 |
| | 647 | — | 650 | 780 | 794 | >1,220 | 447 |
| | 638 | — | 620 | 767 | 795 | >1,220 | 280 |

[1] Resistivity in ohm-centimeters.

In Table I the initial resistivities are set forth in column 1. These measurements, as well as those set forth in succeeding columns, are reported in ohm-centimeters for intervals of approximately 0.2 inch. Actually, some measurements were made along the crystalline samples at closer spacings. For resistivities less than 10 ohm-centimeters, a two-point probe with point spacings of 0.01 inch was employed, measurements being taken at intervals of 0.005 inch and recorded on a Leeds and Northrup Speedomax recorder. For resistivities in excess of 10 ohm-centimeters, a four-point probe and type K potentiometer were utilized. Intervals were of the order of 0.2 inch. It is seen that the bombardment has greatly increased the resistivity, so indicating large concentrations of crystal defects with ionization energies lying near the center of the energy gap. For bars 1 and 2, the resistivity is indicated to be in excess of 110,000 ohm-centimeters. For bars 3 and 4, measurements indicated a level of the order of 83,000 ohm-centimeters.

After the resistivity had been measured following bombardment, the samples were etched in a mixture of five parts concentrated nitric acid to one part concentrated hydrofluoric acid to remove surface contaminants.

are still of excessively high resistivity, so indicating that bombardment-induced crystal defects have not been annealed out. Resistivity measurements made on the same samples after a further etching and annealing, this time at 600 degrees centigrade for one hour, show the bombarded samples to be at a level ranging from about 3.6 to 4.0 ohm-centimeters. All the samples are now n-type. Variations in resistivity readings made on the control samples due to migration of contaminants on annealing are noted. After a further etching and annealing, this time for one hour at 800 degrees centigrade (column 6), it is seen that bars 1 through 4 are all now of n-type conductivity of a resistivity of 2.5, within the measurement error of plus or minus 3 percent. From column 7 it is seen that a further heat treatment at 1200 degrees centigrade has resulted in no substantial change.

Although the annealing steps reported in Table I were cumulative, further experiment has indicated that any one of the annealing steps taken singly brings about the reported results, so that from this data it is seen that annealing for one hour at 800 degrees centigrade is sufficient to result in substantial removal of lattice damage. As reported herein, it is indicated that a one-hour anneal at a temperature as low as 635 degrees centigrade brings about results substantially as reported in column 6.

It is interesting to note that wide deviations, both in conductivity-type and resistivity, were brought about in the control samples (5 and 6) after annealing at temperatures below 800 degrees centigrade. These deviations, due to surface contaminants, have had no effect on the bombarded samples in which it must be assumed the same changes have taken place.

Assuming that the resistivities observed in the bombarded samples after heat treatment for one hour at 800 degrees centigrade (column 6) and one hour at 1200 degrees centigrade (column 7) are representative of the phosphorus 31 produced in the sample by neutron bombardment, the cross section for neutron capture may be calculated from the resistivity and the total integrated neutron flux. Using the mobility values of 1230 centimeters squared per volt second, a cross section of 0.093 barn is obtained. This compares with the reported cross section of 0.110 plus or minus 0.010 barn ("Neutron Cross Sections," D. J. Hughes and J. A. Harvey, United States Atomic Energy Commission, McGraw-Hill, New York, 1955). The two values differ by about 20 percent. This variation may be traceable to the transmutation of silicon 28 by absorption of one neutron and the release of two neutrons so silicon 27, which decays to aluminum 27, an acceptor, and also to the transmutation of silicon 30 to magnesium 27 with absorption of one neutron and release of one alpha particle, this isotope also decaying to produce aluminum 27. Occurrence of these reactions has the sole effect of reducing the apparent cross section for the desired silicon 30 (n, $\gamma$) silicon 31 reaction. Reproducibility from sample to sample is not affected.

EXAMPLE 2

A second irradiation experiment used the Oak Ridge experimental reactor at an average thermal neutron flux of $1.7\times10^{14}$ neutrons per square centimeter and a total integrated flux of $1.4\times10^{20}$ neutrons per square centimeter. The sample to be bombarded was a section of a floating zone single crystal designated HR–33, approximately 4 centimeters long and 1 centimeter in diameter, having an initial resistivity of the order of 300 to 500 ohm-centimeters and evidencing slightly p-type conductivity. After irradiation, the sample was cut into two bars 0.2 x 0.2 x 2.0 centimeters (bars 7 and 8). A set of control samples of the same dimension was also prepared. This set (bars 9 and 10) was cut from the unbombarded section of the same floating zone crystal, HR–33. Results are reported in tabular form in Table II.

Resistivity measurements and etching and annealing procedures were all as reported in the discussion relating to Table I. In Table II, however, column 1 reports resistivity measurements made on bars 7 and 8 after bombardment, as well as initial readings made on control bars 9 through 12.

Here, again, it is observed that after one hour at 800 degrees centigrade all of the radiation damage that can be annealed has been removed. Large changes in the high resistivity controls (bars 9 and 10), indicative of contamination, are also observed. The integrated neutron flux in this example was of the order of ten times greater than that of Example 1 above. The effects of any given level of contamination are, therefore, less important.

The average resistivity of the bombarded specimens after the 800 degrees centigrade anneal is 0.336 ohm-centimeter, and the standard deviation is 0.005 ohm-centimeter, or less than 2 percent.

Based on the data reported in Tables I and II and on the assumption that the removing of lattice defects occurs at the known diffusion rate for vacancies, it is possible to calculate required annealing times for various temperatures. It is indicated that one hour at 635 degrees centigrade is the minimum required time for that temperature and that ten minutes is required at 800 degrees centigrade.

Although it may, on occasion, be necessary to introduce a separate annealing step to stabilize the resistivity level of the material, subsequent fabrication steps in the manufacture of a semiconductor device are likely to accomplish this end. In the manufacture of devices utilizing a diffusion step, a temperature of the order of at least 1050 to 1100 degrees centigrade is attained and maintained for at least one hour. It is indicated that it will be necessary to maintain the body at this temperature for only 80 seconds to anneal out defects.

The examples have been carried out using silicon samples with the naturally occurring concentration of silicon 30. Impurity doping levels may be achieved by first doping natural silicon with added silicon 30 isotope. Since the distribution coefficient of silicon 30 is essentially unity, uniform distribution of the added isotope can be achieved by a single complete fusion.

The examples have been in terms of standard size specimens. Alternative procedures may take the form of irradiation of device-size samples or larger specimens. Based on the cross sections for neutron capture, it is calculated that a thermal neutron beam is attenuated approximately 0.4 percent in passing through 1 centimeter of silicon. Accordingly, to achieve a uniformity which does not vary by more than 5 percent, it is desirable to keep the maximum neutron path length less than 12.5 centimeters. This suggests that the maximum cross sectional

*Table II*

| | Initial | 1 hour 600° C. | 1 hour 800° C. | 1 hour 1,000° C. | 1 hour 1,200° C. |
|---|---|---|---|---|---|
| | S. P | N | N | N | N |
| Bar 7 (HR-33, A-2F-B—Bombarded) | 170,000 | 130.0 | .335 | .322 | .334 |
| | 175,000 | 74.2 | .340 | .322 | .326 |
| | 183,500 | 42.4 | .340 | .317 | .326 |
| | 183,500 | 27.6 | .345 | .317 | .326 |
| | S. P | N | N | N | N |
| Bar 8 (HR-33, A-2T-B—Bombarded) | 174,000 | 6.44 | .334 | .328 | .331 |
| | 193,000 | 6.24 | .334 | .320 | .331 |
| | 192,000 | 6.24 | .334 | .316 | .324 |
| | 192.000 | 6.44 | .326 | .316 | .324 |
| | 175.500 | 6.63 | .334 | .320 | .331 |
| | P | P | P | P | N |
| Bar 9 (HR-33, A-1-B—Not bombarded) | 542 | 570 | 865 | 1,182 | 1,440 |
| | 515 | 515 | 685 | 1,105 | 6,488 |
| | 492 | 502 | 855 | 968 | 212 |
| | 460 | 474 | 752 | 1,025 | 560 |
| Bar 10 (HR-33, A-3-B—Not bombarded) | 319 | 342 | 363 | 708 | 297 |
| | 348 | 336 | 350 | 772 | 178 |
| | 335 | 320 | 375 | 718 | 168 |
| | 335 | 327 | 384 | 738 | 1,000 |
| | 333 | 306 | 403 | 740 | 1,030 |

dimension of any sample should not exceed 25 centimeters, in turn indicating that this degree of uniformity is obtainable in a sample having a cross sectional area of 625 square centimeters. A cubic sample of this cross sectional area contains 156,000 cubic centimeters of silicon and weighs approximately 37.5 kilograms. In the irradiation of such large samples, where there is an appreciable flux density variation in the reactor, it is desirable to utilize a rotating means such as that depicted in the figure. Equilibrium is achieved by such rotation with very slow rotational velocities, rotation of the order of 360 degrees per hour or less being sufficient.

Calculations have been made to determine the potential importance of side reactions. It has been determined, in general, that side reactions involving silicon are insignificant for reported thermal neutron fluxes now available, the chief effect being to produce a small amount of acceptor material, so effecting a slight reduction in the calculated cross section for the desired reaction.

Possible reactions involving oxygen impurities have been considered. These considerations are not important where floating zone silicon is used, since the oxygen level is typically of the order of below $10^{16}$ atoms per cubic centimeter. Where irradiation is to be carried out on pulled crystals which may contain as much as $10^{19}$ oxygen atoms per cubic centimeter, these considerations may be material. For thermal neutrons, the main effect is to alter the oxygen isotope ratio and to produce small amounts of carbon 14 and fluorine 19. Probably the main danger results from the long half-life of carbon 14. Based on a maximum initial oxygen concentration of $10^{18}$ atoms per cubic centimeter, it is determined that the amount of fluorine and carbon produced is of the order of about $10^{-9}$ and $10^{-7}$ of the amount of phosphorus 31, respectively. Such quantities are negligible. It, therefore, appears that samples containing up to $10^{18}$ oxygen atoms per cubic centimeter and higher may be safely irradiated.

It has been indicated that the limitations on the final resistivity level are practical by nature. Based on present cost considerations, the method is considered economically feasible for doping up to $5\times10^{17}$ atoms per cubic centimeter. Certain assumptions have been made on the basis of which desired initial impurity levels were set forth. Such a discussion has been in terms of a maximum resistivity deviation of plus or minus 3 percent. Where greater deviation can be tolerated, the initial resistivity may be lower for a given sample size.

All discussion has been in terms of thermal neutrons. The fluxes actually used, however, contained an appreciable number of higher energy particles. For example, the Oak Ridge reactor had a flux of $9.5\times10^{12}$ neutrons per square centimeter per second, with energies in excess of 2.3 million electron volts, or a total integrated flux of such neutrons of $7.8\times10^{18}$ neutrons per square centimeter for the exposure time used. Although a study of reactions occurring in the presence of appreciable concentrations of high energy neutrons does not indicate deleterious reactions of any significance, it is noted that the cross section for the desired reaction decreases as the energy of the neutrons increases. In the practice of this invention, it is, therefore, preferred that the flux consist predominantly of thermal neutrons. Thermal neutron fluxes presently available are suitable. Larger amounts of high energy neutrons may be tolerated, although the efficiency is reduced.

Radioactivity of both sets of samples has been measured. The Oak Ridge reactor resulted in sample radioactivity of the order of 16 milliroentgens per hour two days after bombardment composed solely of 1.47 million electron volt beta particles with a decay time of 14.2 days. Radioactivity of the Brookhaven samples was repotred in Example 1. The handling danger for such samples is, of course, a function of total volume as well as unit radioactivity. Current standards indicate a level of 100 milliroentgens per week to be tolerable for continuous exposure.

What is claimed is:

1. Method for producing uniform resistivity n-type silicon of a desired excess significant impurity concentration comprising bombarding a body of silicon having an excess significant impurity concentration level at least one order of magnitude less than the desired concentration with predominantly thermal neutrons so as to convert a fraction of silicon 30 to phosphorus 31, and subsequently annealing the bombarded body to substantially remove radiation damage.

2. Method in accordance with claim 1 in which the position of the said body is altered during bombardment.

3. Method for producing a semiconductor transducing device including at least one p-n junction in which a region of material processed in accordance with claim 1 is converted to p-type conductivity by the introduction of p-type conductivity inducing significant impurity and in which electrode contact is made to the unconverted region and to another region.

4. Uniform n-type silicon of claim 1.

5. Method in accordance with claim 3 in which conversion is brought about by diffusion.

References Cited in the file of this patent

Broude, Green, Singh, and Willmott: Physical Review, vol. 101, No. 3, page 1052 (1956).

Cleland, Crawford, Jr., and Pigg: Phys. Rev., 98, 1742–50 (1955).

Cleland, Lark-Horovitz, and Pigg: Phys. Rev., 78, 814–15 (1950).

Cleland, Crawford, Jr., and Pigg: Phys. Rev., 99 1170–81 (1955).